(12) United States Patent
An et al.

(10) Patent No.: US 7,956,959 B2
(45) Date of Patent: Jun. 7, 2011

(54) DISPLAY DEVICE AND METHOD OF MANUFACTURING OF THE SAME

(75) Inventors: Su Chang An, Seoul (KR); So Haeng Cho, Yongin-si (KR); Jae Hoon Park, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 246 days.

(21) Appl. No.: 12/314,913

(22) Filed: Dec. 18, 2008

(65) Prior Publication Data

US 2010/0053524 A1    Mar. 4, 2010

(30) Foreign Application Priority Data

Aug. 29, 2008    (KR) .................. 10-2008-0084838

(51) Int. Cl.
G02F 1/1335    (2006.01)
G02F 1/1333    (2006.01)
B32B 17/10     (2006.01)
B32B 27/00     (2006.01)

(52) U.S. Cl. .................. 349/112; 428/220; 349/122

(58) Field of Classification Search .......... 349/88, 349/96, 122, 153, 190, 116, 119, 187; 359/485, 359/499; 156/60; 428/220
See application file for complete search history.

(56) References Cited

U.S. PATENT DOCUMENTS

| | | | |
|---|---|---|---|
| 6,191,833 B1* | 2/2001 | Hirakata | 349/61 |
| 6,559,915 B1* | 5/2003 | Amimori et al. | 349/112 |
| 6,970,213 B2* | 11/2005 | Kawahara et al. | 349/96 |
| 7,227,685 B2* | 6/2007 | Umemoto et al. | 359/496 |
| 7,365,816 B2* | 4/2008 | Kawai et al. | 349/118 |
| 7,557,883 B2* | 7/2009 | Kawamoto et al. | 349/119 |
| 2006/0029784 A1* | 2/2006 | Doan et al. | 428/220 |
| 2006/0098137 A1* | 5/2006 | Kameyama et al. | 349/96 |

* cited by examiner

*Primary Examiner* — Akm Ullah
(74) *Attorney, Agent, or Firm* — McKenna Long & Aldridge LLP

(57) ABSTRACT

A display device includes: a back light unit for emitting a light; a lower polarization plate on the back light unit; a liquid crystal display panel on the lower polarization plate for displaying an image; an upper polarization plate on the liquid crystal display panel; an optical film bonded to the upper polarization plate; and a transparent material on the optical film for improving hardness of the optical film.

8 Claims, 7 Drawing Sheets

DISPLAY DEVICE AND METHOD OF MANUFACTURING OF THE SAME

This application claims the benefit of Korean Application No. 10-2008-0084838, filed on Aug. 29, 2008, which is hereby incorporated by reference for all purposes as if fully set forth herein.

BACKGROUND OF THE INVENTION

1. Field of the Invention

The present invention relates to display devices, and more particularly, to a display device which can provide clear contents.

2. Discussion of the Related Art

Recently, different kinds of flat display devices are under development for reducing a weight and a size which are disadvantages of a cathode ray tube.

In the flat display devices, there are liquid crystal display (LCD) devices, field emission display devices, plasma display (PDP) devices, electro-luminescence (EL) display devices, and so on. Research is underway for improving a display quality of the flat display device and making a screen size of the flat display device greater.

Of the flat display devices, the LCD device is a non-light emitting type display device which produces an image by using a light source such as a lamp, displays information by using electro-optical properties of liquid crystal injected in a liquid crystal display panel, and has advantages in that a small sized display device can be fabricated, and the display device has light weight and a low power consumption.

That is, different from the cathode ray tube, since the liquid crystals injected between a TFT substrate and a color filter substrate is not a light emitting substance, but a light-receptive substance which controls a quantity of external light incident thereon and displays the light controlled thus on a screen, an additional device for directing the light to the liquid crystal display panel, i.e., a back light assembly, is required.

In the back light assembly, there are a direct-lighting type back light assembly, and an edge-lighting type back light assembly, wherein the direct-lighting type back light assembly has the lamps under the liquid crystal display panel, for direct lighting of an entire surface of the liquid crystal display panel, and is disadvantageous in that power consumption and a production cost is high, and thickness is thick. In comparison to this, the edge-lighting type back light assembly has lamps at one or opposite sides of the liquid crystal panel for lighting the liquid crystal display panel with a light diffused by using a light plate and reflective plate, and uses cold cathode fluorescent lamp CCFL as the lamp mostly, and is advantageous in that thickness is thin to have a light weight and power consumption is low, to use widely. However, the edge-lighting type back light assembly requires the light plate for guiding the light from a side thereof to a front side thereof.

The edge-lighting type back light assembly is provided with a mold frame having a holding space formed therein, a reflective sheet on a bottom surface of the holding space for reflecting the light toward the liquid crystal display panel, the light plate on the reflective sheet for guiding the light, a lamp unit between the light plate and a side wall of the holding space for emitting the light, optical sheets stacked on an upper surface of the light plate for diffusing and converging the light, an a top sash on a top of the mold frame for covering from a predetermined portion of edges of the liquid crystal display panel to a side of the mold frame.

The optical sheets may have a diffusing sheet for diffusing the light, prism sheets stacked on an upper surface of the diffusing sheet for converging and forwarding the light diffused thus to the liquid crystal display panel, and a protective sheet for protecting the diffusing sheet and the prism sheet.

FIG. 1 illustrates a section of a related art liquid crystal display device schematically, and FIG. 2 illustrates a section of the upper polarization sheet in FIG. 1.

Referring to FIG. 1, the related art liquid crystal display device is provided with a back light unit 10 for emitting a light, a lower polarization plate 20 on the back light unit 10, a liquid crystal display panel 30 on the lower polarization plate 20 for displaying an image, an upper polarization plate 40 on the liquid crystal display panel 30, and a sheet of toughened glass 60 bonded to the upper polarization plate 40 with an UV pressure sensitive adhesive 50.

Referring to FIG. 2, the upper polarization plate 40 is provided with a release film 41, first tri-acetyl cellulose TAC 43 bonded to the release film 41 with a pressure sensitive adhesive PSA 42, an elongated poly vinyl alcohol PVA film 44 on the first TAC 43, a second TAC 45 on the PVA film 44, and a DBEF (Dual Brightness Enhancement Film) 46 on the second TAC 45 for enhancing brightness of the liquid crystal display panel 30.

In the meantime, the lower polarization plate 20 is provided the same with the upper polarization plate 40 except the DBEF 46.

The related art liquid crystal display device is susceptible to scratch due to low hardness of the DBEF 46 in the upper polarization plate 40. For supplementing this, the toughened glass 60 is bonded on an entire surface of the liquid crystal display panel.

However, the related art liquid crystal display device has a surface which is not mirror smooth due to a rugged surface of the DBEF-polarization plate which becomes poorer after bonding the toughened glass thereto such that the related art liquid crystal display device can not be used, not only as a mirror, but also as a display device.

That is, in order to solve the scratch problem, though the toughened glass is bonded to the entire surface of the liquid crystal display panel, and, in order to remove an air gap between the liquid crystal display panel and the toughened glass, the UV pressure sensitive adhesive is applied and an UV beam is directed thereto to solve the scratch problem, the ruggedness of the surface of the display becomes more intensive such that the related art liquid crystal display device can not be used, not only as a mirror, but also as a display device.

In the meantime, the ruggedness of a raw material of the polarization plate becomes the more intensive as a size of the panel becomes the larger, and the bonding between the polarization plate and the rugged portion of the pressure sensitive adhesive forms grain enough to see with naked eyes.

SUMMARY OF THE INVENTION

Accordingly, the present invention is directed to a display device that substantially obviates one or more of the problems due to limitations and disadvantages of the related art.

An advantage of the present invention is to provide a display device in which an optical film, such as a DBEF, is applied separate from a polarization plate for improving a rugged mirror surface to provide a clear mirror and display device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described herein, a display device includes: a back light unit for emitting a light, a lower polarization plate on the back light unit; a liquid crystal display panel on the lower polarization plate for displaying an image; an upper polarization plate on the liquid crystal display panel; an optical film bonded to the upper polarization plate; and a transparent material on the optical film for improving hardness of the optical film.

In another aspect of the present invention, a method of manufacturing a display device includes: forming a back light unit for emitting a light; forming a lower polarization plate on the back light unit; forming a liquid crystal display panel on the lower polarization plate for displaying an image; forming an upper polarization plate on the liquid crystal display panel; bonding an optical film to the upper polarization plate; and forming a transparent material on the optical film for improving hardness of the optical film.

In yet another aspect of the present invention, a display device includes: a back light unit for emitting a light; a lower polarization plate on the back light unit; a liquid crystal display panel on the lower polarization plate for displaying an image; an upper polarization plate on the liquid crystal display panel; an optical film bonded to the upper polarization plate; and a hard coating applied to an entire surface of the optical film for improving hardness of the optical film.

In yet another aspect of the present invention, a method of manufacturing a display device includes: forming a back light unit for emitting a light; forming a lower polarization plate on the back light unit; forming a liquid crystal display panel on the lower polarization plate for displaying an image; forming an upper polarization plate on the liquid crystal display panel; bonding an optical film to the upper polarization plate; and applying a hard coating to an entire surface of the optical film for improving hardness of the optical film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which is illustrated in the accompanying drawings. Wherever possible, the same reference numbers will be used throughout the drawings to refer to the same or like parts.

Figure 1:
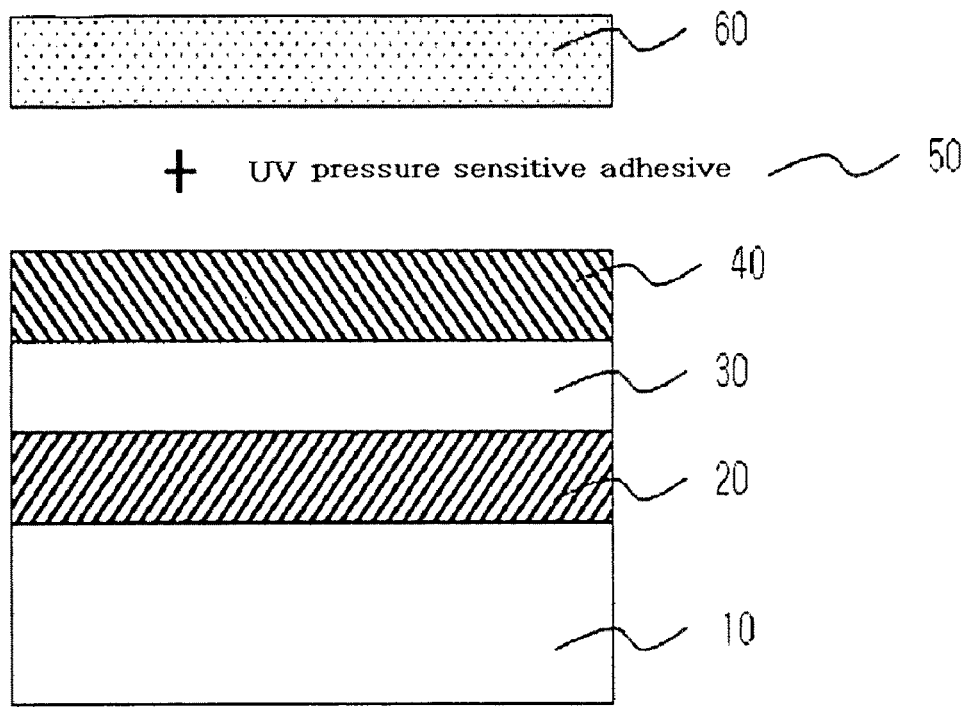
FIG. 1 illustrates a section of a related art liquid crystal display device, schematically.
Figure 2:
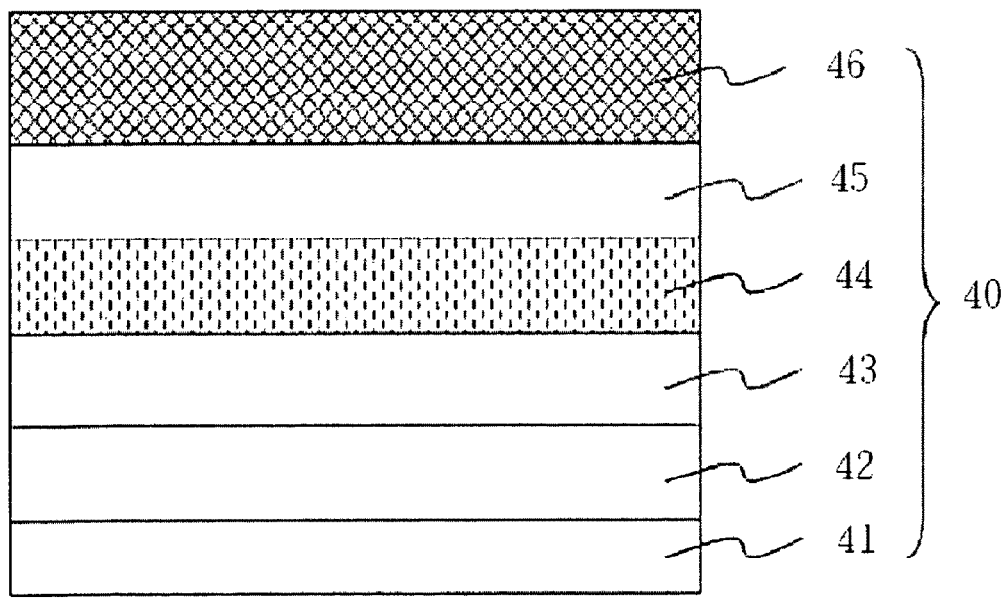
FIG. 2 illustrates a section of the upper polarization sheet in FIG. 1.
Figure 3:
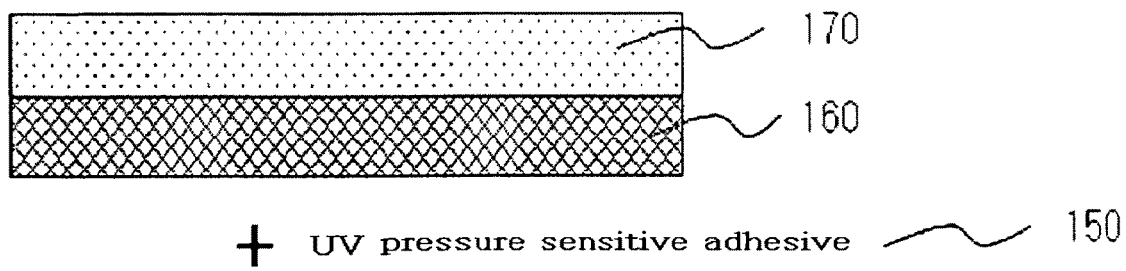
FIG. 3 illustrates a section of a liquid crystal display device in accordance with an embodiment of the present invention, schematically.
Figure 3:
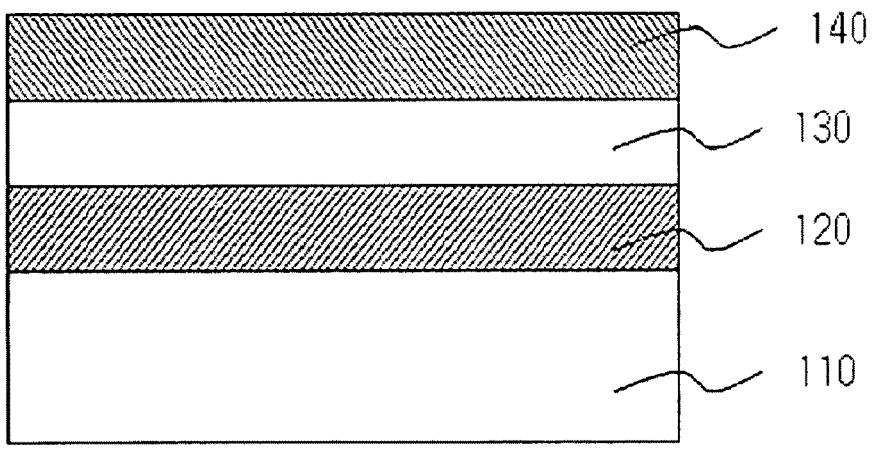
Figure 4:
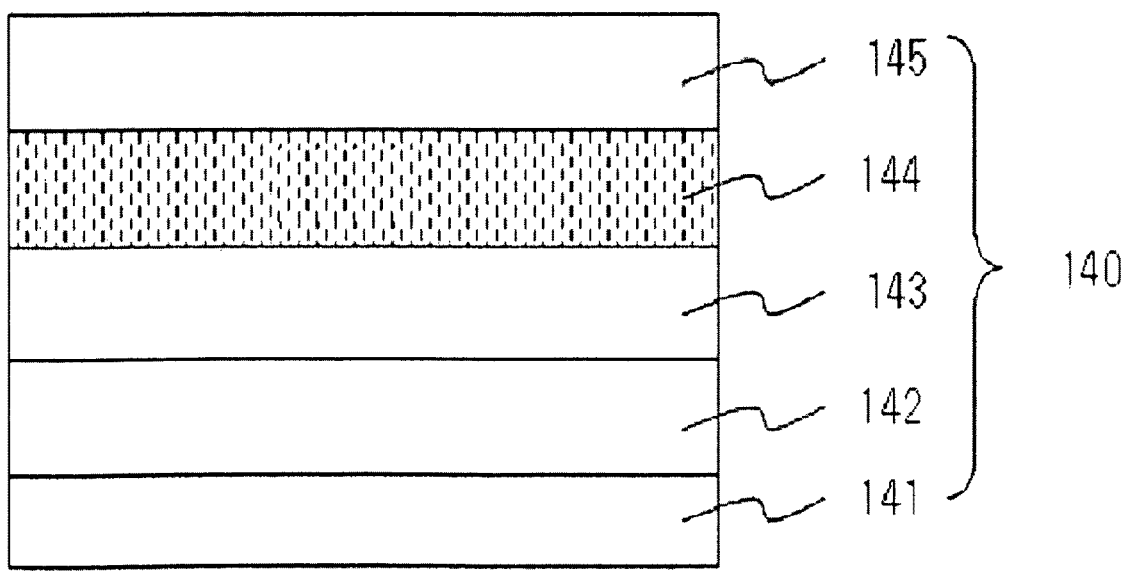
FIG. 4 illustrates a section of the upper polarization sheet in FIG. 3.

FIG. 3 illustrates a section of a liquid crystal display device in accordance with an embodiment of the present invention schematically, and FIG. 4 illustrates a section of the upper polarization sheet in FIG. 3.

Referring to FIG. 3, the liquid crystal display device includes a back light unit 110 for emitting a light, a lower polarization plate 120 on the back light unit 110, a liquid crystal display panel 130 on the lower polarization plate 120 for displaying an image, an upper polarization plate 140 on the liquid crystal display panel 130, a DBEF 160 bonded to the upper polarization plate 140 with an UV pressure sensitive adhesive 150, and a sheet of toughened glass 170 on the DBEF 160 for improving hardness of the DBEF 160.

Referring to FIG. 4, the upper polarization plate 140 includes a release film 141, first tri-acetyl cellulose TAC 143 bonded to the release film 141 with a pressure sensitive adhesive PSA 142, an elongated poly vinyl alcohol PVA film 144 on the first TAC 143, and a second TAC 145 on the PVA film 144.

The upper polarization film 140 and the lower polarization film 120 have axes perpendicular to each other, and the DBEF 160 has a direction of an axis the same with the axis of the upper polarization film 140.

Though not shown, the liquid crystal display panel 130 has liquid crystals filled between a lower substrate and a upper substrate, which can be used in all of modes of IPS, TN, VA, and ECB.

Toughened glass 170 is used in this embodiment of the present invention, but other transparent materials, such as glass, transparent plastic may be used.

Moreover, the toughened glass may not be used, but the entire surface of the DBEF 160 may be hard coating processed.

Eventually, in order to produce a mirror and a display at a time by using the selective reflection of the DBEF 160 on a light, after separating the DBEF 160 from the upper polarization plate 140, the DBEF 160 and the upper polarization plate 140 are bonded with the UV pressure sensitive adhesive 150.

Though the embodiment describes that the DBEF 160 and the upper polarization plate 140 are bonded with the UV pressure sensitive adhesive 150, the DBEF 160 may be bonded to the upper polarization plate 140, directly. If the DBEF 160 is bonded to the upper polarization plate 140 directly, there may be an air gap formed between the DBEF 160 and the upper polarization plate 140.

Moreover, though the embodiment describes the liquid crystal display panel 130, a panel, such as an organic EL and a PDP, may be used.

Figure 5:
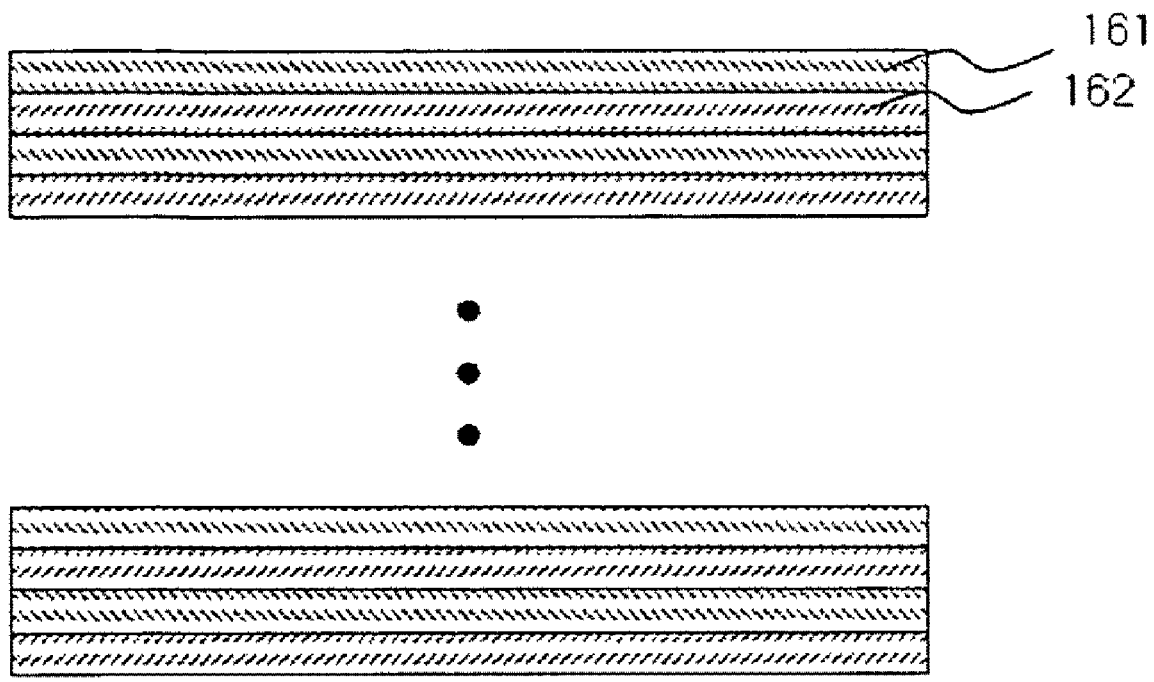
FIG. 5 illustrates a section of the DBEF in FIG. 3.

FIG. 5 illustrates a section of the DBEF in FIG. 3.

Referring to FIG. 5, the DBEF 160 is a multilayered optical film having a few hundred layers of polymer (for an example, polyester group) each with about 0.3 μm thick. The multilayered polymer film is formed by a micron thin film stacking technology, in which layers of different refractive indices are formed, alternately.

In more detail, the DBEF 160 includes a multilayered optical film having a high refractive index layer 161 and a low refractive index layer 162 having a refractive index different from the high refractive index layer 161 formed alternately.

Figure 6A:
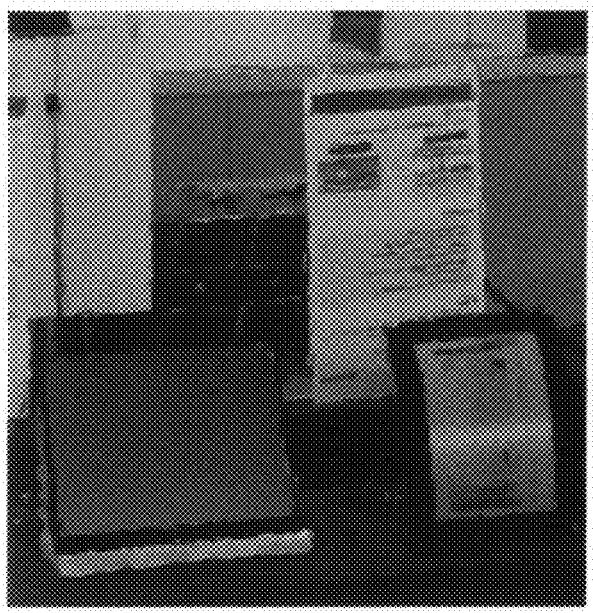
FIGS. 6A and 6B illustrate photographs for comparing a related art liquid crystal display device to an embodiment of the liquid crystal display device of the present invention.
Figure 6B:
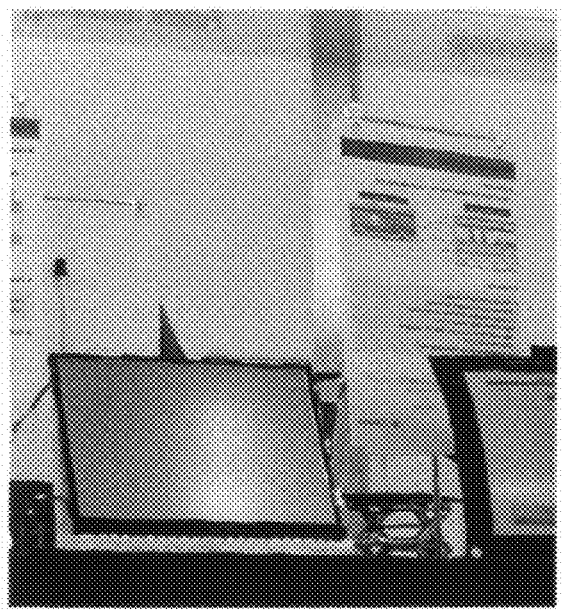

FIGS. 6A and 6B illustrate photographs for comparing a related art liquid crystal display device to an embodiment of the liquid crystal display device of the present invention.

The embodiment improves the ruggedness of the display device distinctively even if the toughened glass is used as it is as shown in FIG. 6B in comparison to the related art in FIG. 6A.

FIGS. 7A~7D illustrate photographs showing a result of experiment of an embodiment of the liquid crystal display device of the present invention.

Figure 7A:
FIGS. 7A~7D illustrate photographs showing a result of experiment of an embodiment of the liquid crystal display device of the present invention.
Figure 7B:
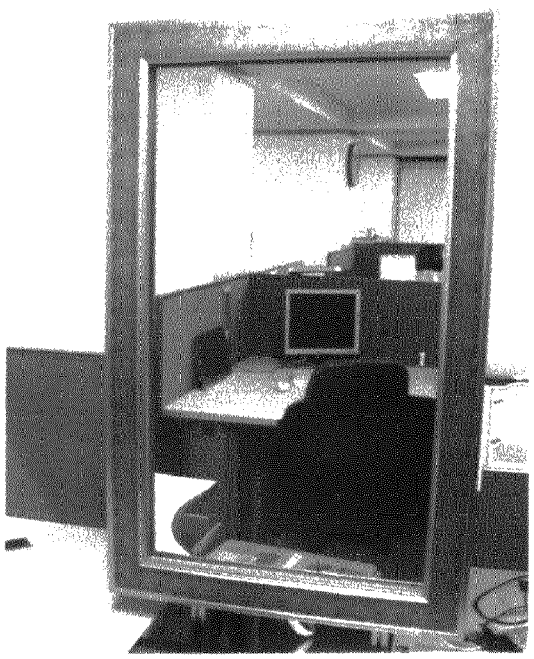

That is, as a result of bonding a DBEF polarization plate to an entire surface of the upper surface of a 42" panel, a mirror display sample having a display function can be fabricated together with a mirror as shown in photographs of FIGS. 7A and 7B.

FIG. 7A illustrates a panel before driving the panel. When the panel is driven (in a black mode), a front surface of the panel functions as a mirror as shown in FIG. 7B.

Figure 7C:
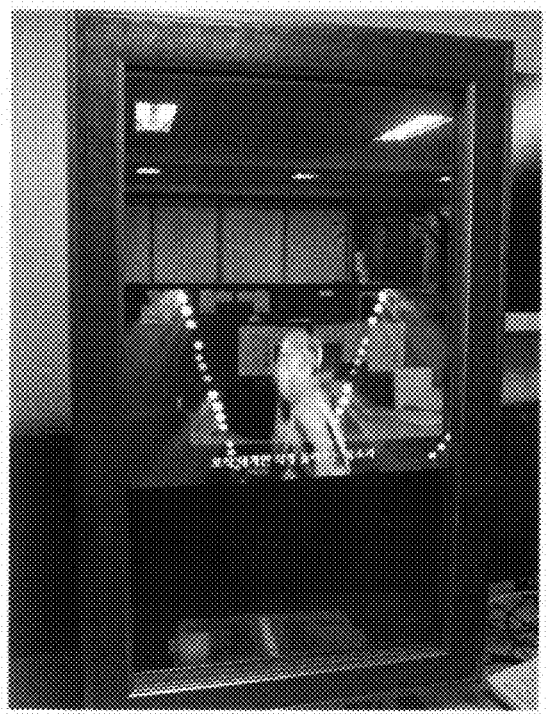
Figure 7D:

Furthermore, referring to FIGS. 7C and 7D, by driving a motion picture (or a photograph) at a region of the panel, functions of the mirror and the display can be performed at the same time. Therefore, by attaching the DBEF 160 to the front surface of the panel, a liquid crystal display device having functions of a mirror and a display can be fabricated.

Table 1 below shows a result of brightness measurement of the liquid crystal display device.

TABLE 1

| Black | White | CR |
|---|---|---|
| 0.37 nit | 484 nit | 1308 |

Referring to TABLE 1, as a result of black/white brightness measurement, CR is about 1300, which is equivalent of a mass production level (CR specification: minimum-900, rated-1300), permitting to determine that there is no drop of CR.

The mirror function is due to a selective reflection characteristic to a light of the DBEF 160. The DBEF 160 is used in the back light unit for enhancing brightness, originally. The DBEF has the following structure and reflection characteristic principle.

Figure 8:
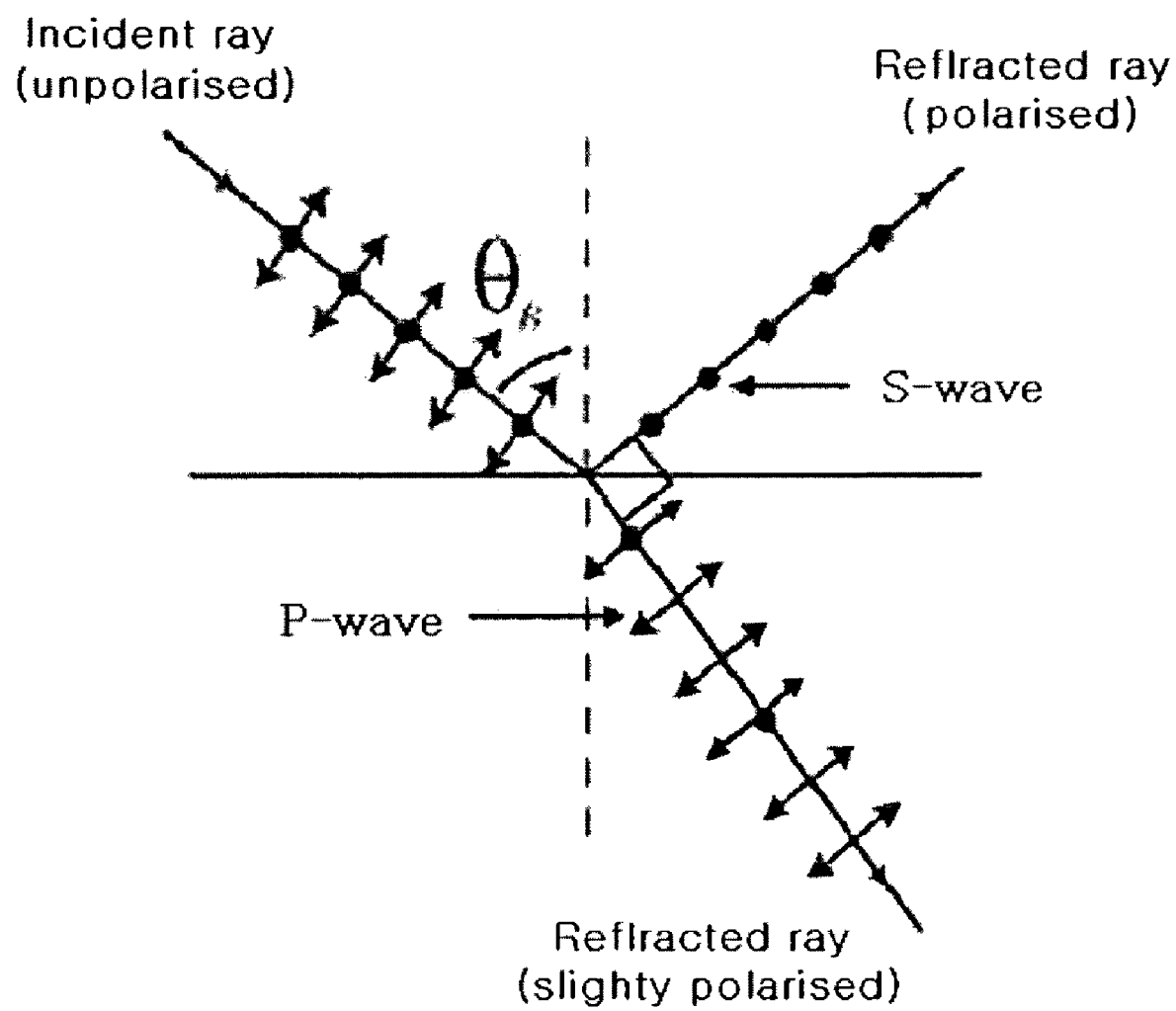
FIG. 8 illustrates a diagram showing polarization of a light incident from a Brewster angle for explaining a selective reflection principle of a DBEF.

FIG. 8 illustrates a diagram showing polarization of a light incident from a Brewster angle for explaining a selective reflection principle of a DBEF.

That is, the DBEF can function as a mirror owing to the selective reflection characteristic. This is utilization of a principle in which reflection of a light takes place at an interface of two media when the light passes through two media having refractive indices different from each other.

Particularly, referring to FIG. 8, the selective reflection characteristic of the DBEF 160 can be explained by the Brewster angle law. In a case the light incident at the Brewster angle, though a P-wave component of which polarization direction is parallel to an incident plane passes through the medium entirely, an S-wave component of which polarization direction is perpendicular to an incident plane is reflected (a portion of the S-wave component is reflected). If the P- and S-wave components passed thus come to a surface of a medium having a different refractive index, only the S-wave component is reflected, while the P-and S-wave components pass.

If this step is repeated as the light passes through a plurality of layers of media of refractive indices different from one another, the light can be split into a reflection component which is the S-wave component entirely, and a passed through component which the P-wave component entirely.

The Brewster angle is an incident angle at which a light of a certain polarization state (P-wave) is not reflected at the interface of two media having refractive indices different from each other.

As has been described, the display device of the present invention has the following advantages.

By applying an optical film, such as the DBEF, separate from the polarization plate, a rugged mirror surface can be improved, to provide a clear mirror and display device.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display device comprising:
   a back light unit for emitting a light;
   a lower polarization plate on the back light unit;
   a liquid crystal display panel on the lower polarization plate for displaying an image;
   an upper polarization plate on the liquid crystal display panel;
   a dual brightness enhancement film bonded to the upper polarization plate by using an UV pressure sensitive adhesive between the upper polarization plate and the dual brightness enhancement film; and
   a transparent material on the dual brightness enhancement film for improving hardness of the dual brightness enhancement film,
   wherein the dual brightness enhancement film includes a plurality of optical films having refractive indices different from one another stacked alternately.

2. The display device as claimed in claim 1, wherein the transparent material is selected from a glass and a plastic.

3. The display device as claimed in claim 1, wherein the transparent material is selected from a toughened glass.

4. The display device as claimed in claim 1, wherein the dual brightness enhancement film is selected from a polyester group.

5. A method of manufacturing a display device comprising:
   forming a back light unit for emitting a light;
   forming a lower polarization plate on the back light unit;
   forming a liquid crystal display panel on the lower polarization plate for displaying an image;
   forming an upper polarization plate on the liquid crystal display panel;
   bonding a dual brightness enhancement film to the upper polarization plate by using an UV pressure sensitive adhesive between the upper polarization plate and the dual brightness enhancement film; and
   forming a transparent material on the dual brightness enhancement film for improving hardness of the dual brightness enhancement film,
   wherein the dual brightness enhancement film includes a plurality of optical films having refractive indices different from one another stacked alternately.

6. The method of claim 5, wherein the transparent material is selected from a glass and a plastic.

7. The display device as claimed in claim 5, wherein the transparent material is selected from a toughened glass.

8. The method of claim 5, wherein the optical film is selected from a polyester group.

* * * * *